Nov. 7, 1950 R. E. SMITH 2,529,231
SHEET METAL WHEEL STRUCTURE
Filed Oct. 31, 1945
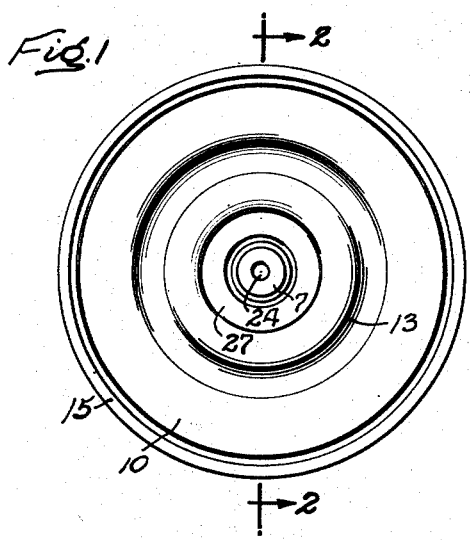
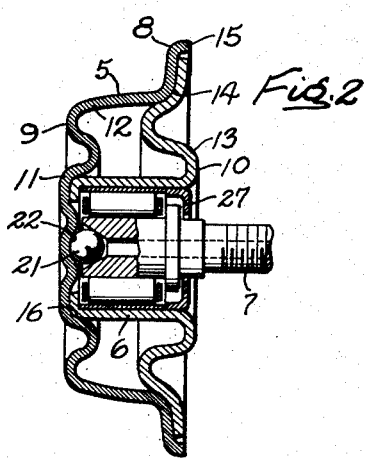
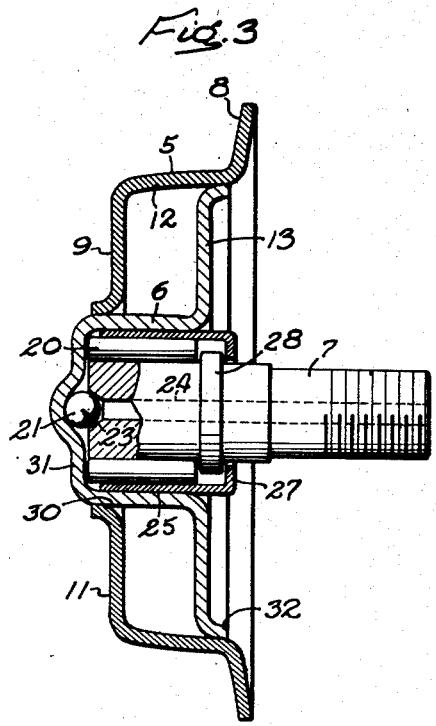
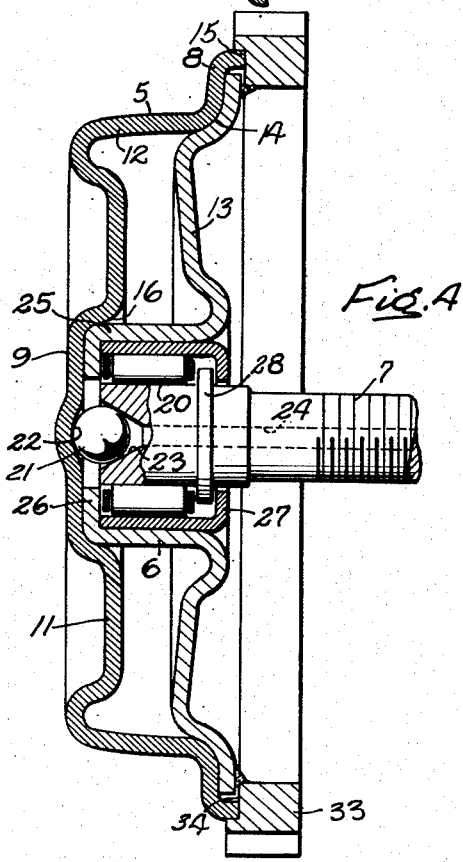
INVENTOR
Ralph E. Smith
ATTORNEYS Patented Nov. 7, 1950

2,529,231

UNITED STATES PATENT OFFICE 2,529,231

SHEET METAL WHEEL STRUCTURE

Ralph E. Smith, Muskegon, Mich., assignor to Manning, Maxwell & Moore, Inc., Muskegon, Mich., a corporation of New Jersey Application October 31, 1945, Serial No. 625,839

3 Claims. (Cl. 295—24)

The invention relates to flanged wheels and particularly to wheels adapted to be fabricated from sheet metal.

One object of the invention is to provide an improved sheet metal wheel characterized particularly by its strength, rigidity and stability.

Another object is to provide a wheel of the above general character having an improved hub and bearing structure which provides more stable support for the wheel and enables the wheel to carry maximum loads.

Another object is to provide an improved construction for flanged wheels which permits hardening of the tread and other wearing surfaces without requiring the hardening and attendant distortion of the parts accommodating the bearings thus insuring a true fit and accurate running of the bearings.

Other objects and advantages of the invention will become apparent from the following detailed description of the preferred embodiment illustrated in the accompanying drawing in which:

Fig. 1 is a side elevational view of a flanged wheel embodying the features of the invention.

Fig. 2 is a sectional view of the wheel taken in a vertical plane substantially on the line 2—2 of Fig. 1.

Fig. 3 is a transverse sectional view of a modified form of the wheel.

Fig. 4 is a transverse sectional view of a wheel of the general type shown in Fig. 2 equipped with a driving gear.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved wheel comprising the present invention has been shown in a form particularly suitable for use with traveling cranes, crane trolleys, and other vehicles of the type adapted to travel on conventional parallel track rails. As shown in the drawing, the wheel comprises generally an annular track engaging tread 5 concentric with an axially elongated hub 6 by which the wheel is supported on a suitable axle 7, the tread 5 having the usual guiding flange 8. The particular axle shown is in the form of a cylindrical stud threaded at one end for convenient attachment to the frame of the vehicle upon which the wheel is to be mounted.

In carrying out the invention, the trolley wheel is, in the main, constructed from two sheet metal stampings, one in the form of a generally cup shaped member or shell 9 providing the tread 5, and the other in the form of a disk 10 secured at its periphery to the shell and having an elongated central or axial portion forming the hub 6. As shown, the shell 9 has a central radially disposed web section 11, an axially turned annular intermediate section 12 constituting the tread 5, and a radially projecting outer edge portion forming the flange 8. The disk 10 comprises a web portion 13 from the center of which is pressed a cylindrical extension forming the hub 6.

In the exemplary wheel shown in Figs. 2 and 4 of the drawing, the web portion 13 of the disk 10 is generally concave or dished to provide maximum rigidity and is dimensioned to overlap the flange 8 of the outer shell 9. Preferably the marginal edge portion of the web 13 is curved as at 14 to fit snugly against the inner face of the flange and extend under the outer edge of the tread forming portion 12 of the shell to support the same. The flange 8 is preferably formed with an axially turned lip 15 adapted to extend over the edge of the web 13 and thus provide a smooth unbroken outer surface for the wheel.

With the inner and outer shells assembled in the manner shown in the drawing and with the abutting marginal edges of the shells secured together as by welding, the web portion 13 of the disk 10 provides rigid support for the inner edge of the tread 5 upon the hub 6. Rigid support for the outer edge of the tread 5 is provided by the web portion 11 of the shell 9 which is formed with a central recess 16 for the reception of the hub 6. The widely spaced supports thus provided between the tread 5 and the hub 6 greatly strengthens the wheel structure and imparts a high degree of rigidity thereto.

The hub 6, by reason of its novel form, is adapted to accommodate an improved bearing structure which renders the wheel very stable in use as it effectually prevents any wobbling of the wheel on the axle regardless of the load imposed thereon. More particularly, the elongated form of the hub 6 together with the means provided for absorbing end thrusts makes it possible to utilize conventional roller bearings 20 for carrying the radial thrust imposed by the load.

As will be seen by reference to Figs. 2 and 4 of the drawing, the end thrust is taken by a separate bearing herein shown as a steel ball 21 interposed between the end of the axle 7 and the web portion 11 of the shell 9. The web 11 is formed with a central depression 22 and the end of the axle 7 is formed with a conical recess 23 to provide a seat for the bearing 21. A bore 24 extending through the axle and communicating with the recess 23 provides a channel through which lubricant may be conveniently supplied to the bearing. The inner end of the bore may be fitted with a conventional grease fitting.

The roller bearings 20 are conveniently mounted in a cylindrical retainer 25 adapted to be secured in the hub 6 as by a press fit. An inturned flange 26 formed at the end of the hub serves to locate the retainer therein. To hold the axle and bearings in assembled relation with the wheel, the end portion of the retainer 25 is flanged inwardly at 27 to overlie a circumferential shoulder 28 formed on the axle. The parts are thus securely held in assembled relation but may be removed if necessary for replacement or repair.

The modified form of the wheel illustrated in Fig. 3 is generally similar to the form above described and presents the same advantages. In this case, however, the web portion 11 of the shell 9 is formed with a central aperture 30 to receive the end of the hub 6 and the latter may be secured to the web by welding. To provide a seat for the thrust bearing 21 the hub 6 is formed with a closed end wall 31. Additionally, the web portion 13 of the disk 10 is formed with a marginal flange 32 dimensioned to fit within the annular tread forming portion 12 of the shell 9. The flange may be welded or otherwise rigidly secured to the shell.

When the improved wheel is to be used as a driving wheel, it is provided with a ring gear 33 as shown in Fig. 4. To facilitate attachment of the gear to the wheel, one face of the gear is recessed as at 34 for the reception of the flange 8. The parts are preferably permanently joined by welding.

In addition to providing increased strength, rigidity and stability, the improved construction also facilitates the manufacture of the wheel. Thus, the shell 9 may be casehardened before assembly with the disk 10 to provide a long wearing surface on the tread 5 and a wear-resistant seat for the bearing 21. As the disk 10 is not subjected to this hardening process, distortion of the hub portion 6 is avoided, thus insuring an accurate fit and true running of the load supporting bearings 20. Moreover, the full strength of the supporting web 13 is retained without the brittleness commonly resulting from casehardening which further improves the strength of the wheel and increases its useful life.

It will be apparent from the foregoing that the invention provides a flanged wheel of novel and improved construction. The wheel is constructed entirely of pressed or stamped metal parts which, by reason of their novel form, provide maximum strength and rigidity and which accommodate a novel bearing structure providing maximum stability for the wheel. In particular, the wide spacing of the elements connecting the elongated hub and the tread of the wheel insures rigid support of the latter. Moreover, the elongated hub in conjunction with the novel thrust bearing arrangement permits the use of conventional roller bearings for carrying the radial load. The use of roller bearings improves both the stability and the load carrying capacity of the wheel.

I claim as my invention:

1. A wheel and axle assembly comprising, in combination, a cup-shaped shell formed to provide a generally cylindrical track engaging tread with a radially projecting flange at one side, a disk adapted to fit into said shell with its peripheral edge portion engaging the flange of said shell and rigidly connected thereto, said disk having an axially projecting cylindrical hub portion extending toward said shell, said shell having a central web portion recessed to receive said hub portion, an axle having a series of roller bearings at one end enclosed in a cylindrical retainer dimensioned for reception in said hub with a press fit, said roller bearings carrying the radial load imposed on said axle, and a separate bearing in said hub interposed between the end of said axle and the central web portion of said shell for absorbing the axial thrust of the axle.

2. A wheel structure comprising, in combination, a sheet metal shell having an annular intermediate portion defining a track engaging tread, an integral supporting web portion projecting radially inwardly at one edge of the tread and an integral track engaging flange projecting radially outwardly at the other edge of the tread, a disk-shaped member having its peripheral edge portion dimensioned to engage the intermediate portion of said shell adjacent its junction with said flange, and a cylindrical hub portion projecting axially at one side of said member, the web portion of said shell having an aperture for receiving said hub portion whereby to support said tread thereon.

3. A wheel and axle assembly comprising, in combination, an axle having at one end a series of roller bearings enclosed by a cylindrical retainer, a sheet metal shell shaped to provide an annular track-engaging tread with a centrally recessed radially inwardly extending web at one side and a radially outwardly projecting flange at the other side, a sheet metal member assembled with said shell including a disk-shaped web portion having its outer marginal edge secured to said shell adjacent said flange and an integral elongated cylindrical hub portion projecting axially therefrom toward the web portion of said shell and engaging in the central recess therein, said hub portion being dimensioned to receive said bearing retainer, the web portions of said shell and said member being spaced apart axially of the wheel throughout their entire areas to provide rigid support for said tread.

RALPH E. SMITH.

REFERENCES CITED

The following references are of record in the file of this patent:

UNITED STATES PATENTS

| Number | Name | Date |
| --- | --- | --- |
| 817,636 | Garrison | Apr. 10, 1906 |
| 1,798,700 | Reach | Mar. 31, 1931 |
| 1,848,144 | Pribil | Mar. 8, 1932 |
| 2,001,174 | Zimmerman | May 14, 1935 |
| 2,032,059 | Knapp | Feb. 25, 1936 |
| 2,063,787 | Brown | Dec. 8, 1936 |
| 2,240,493 | Deneen | May 6, 1941 |